United States Patent
Bauer et al.

(10) Patent No.: US 10,179,478 B2
(45) Date of Patent: Jan. 15, 2019

(54) AXLE ASSEMBLY FOR DRIVE DEVICE OF A MOTOR VEHICLE

(71) Applicant: ZF Friedrichshafen AG, Friedrichshafen (DE)

(72) Inventors: Manuel Bauer, Tittling (DE); Rudolf Neumüller, Buechlberg (DE); Paul Lenz, Waldkirchen (DE); Peter Haselberger, Mauth (DE); Horst Sigl, Passau (DE); Daniel Dudek, Salzweg (DE); Matthias Kobler, Perlesreut (DE); Daniela Wagner, Egglham (DE); Rainer Hildebrand, Friedrichshafen (DE); Stefan Brachmeier, Geisenhausen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 120 days.

(21) Appl. No.: 14/857,400

(22) Filed: Sep. 17, 2015

(65) Prior Publication Data

US 2017/0080753 A1  Mar. 23, 2017

(51) Int. Cl.
*B60B 35/16* (2006.01)
*B60B 35/12* (2006.01)
(Continued)

(52) U.S. Cl.
CPC .......... *B60B 35/166* (2013.01); *B60B 35/125* (2013.01); *B60B 35/14* (2013.01); *F16H 57/025* (2013.01); *F16H 57/027* (2013.01); *F16H 57/037* (2013.01); *F16H 48/08* (2013.01); *F16H 57/0457* (2013.01); *F16H 57/0483* (2013.01)

(58) Field of Classification Search
CPC ..... B60B 35/166; B60B 35/163; B60B 35/16; F16H 57/025; F16H 57/037; F16H 57/0409; F16H 57/0421; F16H 57/0423; F16H 57/0424; F16H 57/0427; F16H 57/0483; F16H 57/03; F16H 57/027
See application file for complete search history.

(56) References Cited

U.S. PATENT DOCUMENTS

| | | | | |
|---|---|---|---|---|
| 5,316,106 | A * | 5/1994 | Baedke | B60K 17/16 184/104.3 |
| 7,374,507 | B2 * | 5/2008 | Corless | F16H 57/0483 184/6.12 |
| 8,109,174 | B2 * | 2/2012 | Hilker | F16H 57/0421 184/6.12 |
| 8,858,381 | B2 * | 10/2014 | Trost | B60B 35/16 475/160 |

(Continued)

FOREIGN PATENT DOCUMENTS

| CN | 201592633 U | 9/2010 |
|---|---|---|
| CN | 203051708 U | 7/2013 |

(Continued)

*Primary Examiner* — Daniel D Yabut
(74) *Attorney, Agent, or Firm* — Cozen O'Connor

(57) ABSTRACT

An axle assembly for a drive device for the road wheels of a vehicle includes: a stationary housing having a housing interior at least partially filled with a lubricating liquid; axle housings connected to the stationary housing and configured to permit axles of the vehicle to pass towards the road wheels; a venting bore in one of the axle housings configured to allow pressurized air to escape from the stationary housing; and at least one rib sized and positioned in the housing interior of the stationary housing so as to prevent migration of the lubricating liquid out of the venting bore.

6 Claims, 5 Drawing Sheets

(51) Int. Cl.
*B60B 35/14* (2006.01)
*F16H 57/027* (2012.01)
*F16H 57/025* (2012.01)
*F16H 57/037* (2012.01)
*F16H 48/08* (2006.01)
*F16H 57/04* (2010.01)

(56) References Cited

U.S. PATENT DOCUMENTS

| | | | |
|---|---|---|---|
| 9,517,658 B2 * | 12/2016 | Chung | F16H 48/08 |
| 2009/0044648 A1 | 2/2009 | Nakata et al. | |
| 2014/0265541 A1 * | 9/2014 | Dockstader | B60B 35/124 |
| | | | 301/137 |
| 2016/0047461 A1 * | 2/2016 | Kelly | F16H 57/0483 |
| | | | 74/607 |

FOREIGN PATENT DOCUMENTS

| | | | | |
|---|---|---|---|---|
| DE | 19704500 C1 | 9/1997 | | |
| DE | 102014007542 A1 | 12/2014 | | |
| EP | 1808325 A1 * | 7/2007 | | B60K 17/16 |
| JP | 59006481 A * | 1/1984 | | B60K 17/16 |
| JP | S 59-102505 U | 7/1984 | | |
| JP | S 60-108854 U | 7/1985 | | |
| JP | S 61-87259 U | 6/1986 | | |
| JP | S 61-134403 U | 8/1986 | | |
| JP | H 01-180303 U | 12/1989 | | |
| JP | H 06-71247 U | 10/1994 | | |
| JP | 2002-059704 A | 2/2002 | | |
| JP | 2003-254414 | 9/2003 | | |

* cited by examiner

AXLE ASSEMBLY FOR DRIVE DEVICE OF A MOTOR VEHICLE

BACKGROUND OF THE INVENTION

1. Field of the Invention

The present invention is directed to an axle assembly in a drive device for the road wheels of a vehicle, the axle assembly having a stationary housing configured to house a differential unit and axle housings through which axles are arranged. The interior of the stationary housing is partially filled with a lubricating liquid, and a rotatably drivable driveshaft is inserted into the housing interior. The driveshaft carries a driving gear wheel at the end of the driveshaft which extends into the interior of the stationary housing. A differential unit having a crown wheel and a differential housing are arranged in the stationary housing. The crown wheel is rotatably bearing-mounted in the stationary housing and is rotatably driven by the driving gear wheel. The crown wheel rotatably drives a plurality of differential gear wheels of the differential unit. Driven gear wheels are rotatably driven in turn by these differential gear wheels. The driven gear wheels are drivingly connected in each instance to driven axle shafts for driving the road wheels of the vehicle. A venting bore is provided in an axle housing of the axle assembly for venting air.

2. Background of the Invention

A drive device, of the type mentioned above, is shown highly schematically in FIG. 1. As shown in the figure, an axle assembly 1 receives a rotating driveshaft 3 and converts the rotational motion of the driveshaft 3, powered by the drivetrain 4, into rotational motion of the axles 5 to drive the wheels 7 of the vehicle. The axle assembly 1 has a generally spherical centrally disposed stationary housing 10, the interior 9 of which is configured to house a differential unit 16. Axle housings 20, through which the axles 5 are disposed, extend from each side of the stationary housing 10.

The driveshaft 3 is guided into the interior 9 of the stationary housing 10 approximately horizontally. At its end the driveshaft 3 carries a driving gear wheel 12, which is formed as, for example, a bevel gear configured to mesh with a crown wheel 14 of a differential unit 16 arranged in the stationary housing 10. The crown wheel 14 is likewise formed as a bevel gear.

It is known for the differential unit 16 to be at least partially immersed in the lubricating liquid in the interior 9 of the stationary housing 10. In conventional stationary housings 10, lubricating liquid is sprayed throughout the stationary housing 10 by the rotational relative motion of various gears and bearings in the differential unit 16, for example by the movement of the crown wheel 14 and the driving gear wheel 12.

A conventional stationary housing 10 of an axle assembly 1 is shown in FIG. 2, without showing the components of the driving gear wheel 12, crown wheel 14, the differential unit 16 and the axles 5. The stationary housing 10 joins, at each side, with axle housings 20, through which the axles 5 pass towards the wheels 7.

A venting bore 22 is provided in one of the axle housings 20. The venting bore 22 allows pressurized air to escape upon excessive buildup of such air, which may occur, for example, due to an increase in the temperature of the lubricating liquid. Differential supports 23 are formed on interior walls of the stationary housing 10 and provide support for the differential unit 16.

The conventional axle assembly 1 has the disadvantage that the lubricating liquid sprayed by the moving components housed in the stationary housing 10 tends to travel toward an area of an oblique inner wall of the stationary housing 10 close to where the axle housing 20 having the venting bore 22 joins the stationary housing 10. This area, which will hereinafter be referred to as an axle bracket, identified by reference numeral 24 in FIG. 2, is located close to the venting bore 22, such that lubricating liquid that splashes on the axle bracket 24 flows along the interior contour of the stationary housing 10 and the axle bracket 24 to the venting bore 22, from which the lubricating liquid can escape.

That is, the splashing of the lubricating liquid by the rotary components of the differential unit 16 can lead to the lubricating liquid flowing along the interior of the stationary housing 10 towards the venting bore 22, which can allow the lubricating liquid to escape through the venting bore 22, leading to an uncontrolled loss of lubricating fluid in axle and stationary housings of the axle assembly 1.

SUMMARY OF THE INVENTION

Taking into account this problem of the prior art, it is an object of the present invention to provide a drive device of the type mentioned above having a modified stationary housing which is constructed in a simple manner and which prevents lubricating liquid splashed by the moving components of the differential unit from flowing along the contour in the interior of the stationary housing towards the venting bore, which can allow lubricating liquid to escape through the venting bore.

This object is met according to the present invention in that the differential unit is enclosed in a stationary housing interior having at least one rib disposed at at least one upper region in the interior of stationary housing. The at least one rib is positioned transverse to the direction of at least one of the driven axle shafts, preferably only at the side of the housing having the venting bore. The at least one rib is arranged in the stationary housing such that lubricating liquid that is splashed on the at least one rib by the action of the moving components of the differential unit collects at the at least one rib and falls back down into the lower portion of the stationary housing, rather than flow towards and escape from the venting bore.

In this manner, during rotating movement the differential unit, and particularly the crown wheel, the lubricating liquid present in the housing interior is properly maintained within the stationary housing to lubricate the components of the differential but does not escape from the stationary housing.

The lubricating liquid level in the housing interior can thus be maintained at a particular level. Therefore, there is always a defined amount of lubricating liquid present in the stationary housing.

According to one aspect of the present invention, an axle assembly for a drive device for the road wheels of a vehicle includes: a stationary housing having a housing interior at least partially filled with a lubricating liquid; axle housings connected to the stationary housing and configured to permit axles of the vehicle to pass towards the road wheels; a venting bore in one of the axle housings configured to allow pressurized air to escape from the stationary housing; and at least one rib sized and positioned in the housing interior of the stationary housing so as to prevent migration of the lubricating liquid out of the venting bore.

In another aspect, the at least one rib is arranged at an upper surface of the interior of stationary housing.

In another aspect, the at least one rib comprises a wall portion projecting radially inwardly in relation to the housing interior and configured to intercept lubricating liquid in the stationary housing.

In another aspect, the at least one rib is formed integrally with the stationary housing.

In another aspect, the at least one rib is fastened to the housing interior of the stationary housing.

In another aspect, the at least one rib is arranged substantially parallel with a drive shaft of the drive device and perpendicular to an axis of rotation of the axles.

In another aspect, the at least one rib comprises a plurality of ribs.

In another aspect, the plurality of ribs are arranged parallel or substantially parallel to one another.

In another aspect, the number of the plurality of ribs equals two.

Size and position of the rib or ribs of the present invention will vary with the size of the axle assembly and the speed of rotation of the movable parts therein, and are easily determined by a person of ordinary skill, keeping in mind the desired functions of the rib(s) and the object of the present invention, namely, to minimize or prevent the lubricating liquid from escaping from the housing interior.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

An embodiment of the present invention is described more fully in the following description and is shown in the accompanying drawing in which.

DETAILED DESCRIPTION OF THE PRESENTLY PREFERRED EMBODIMENTS

Figure 1:
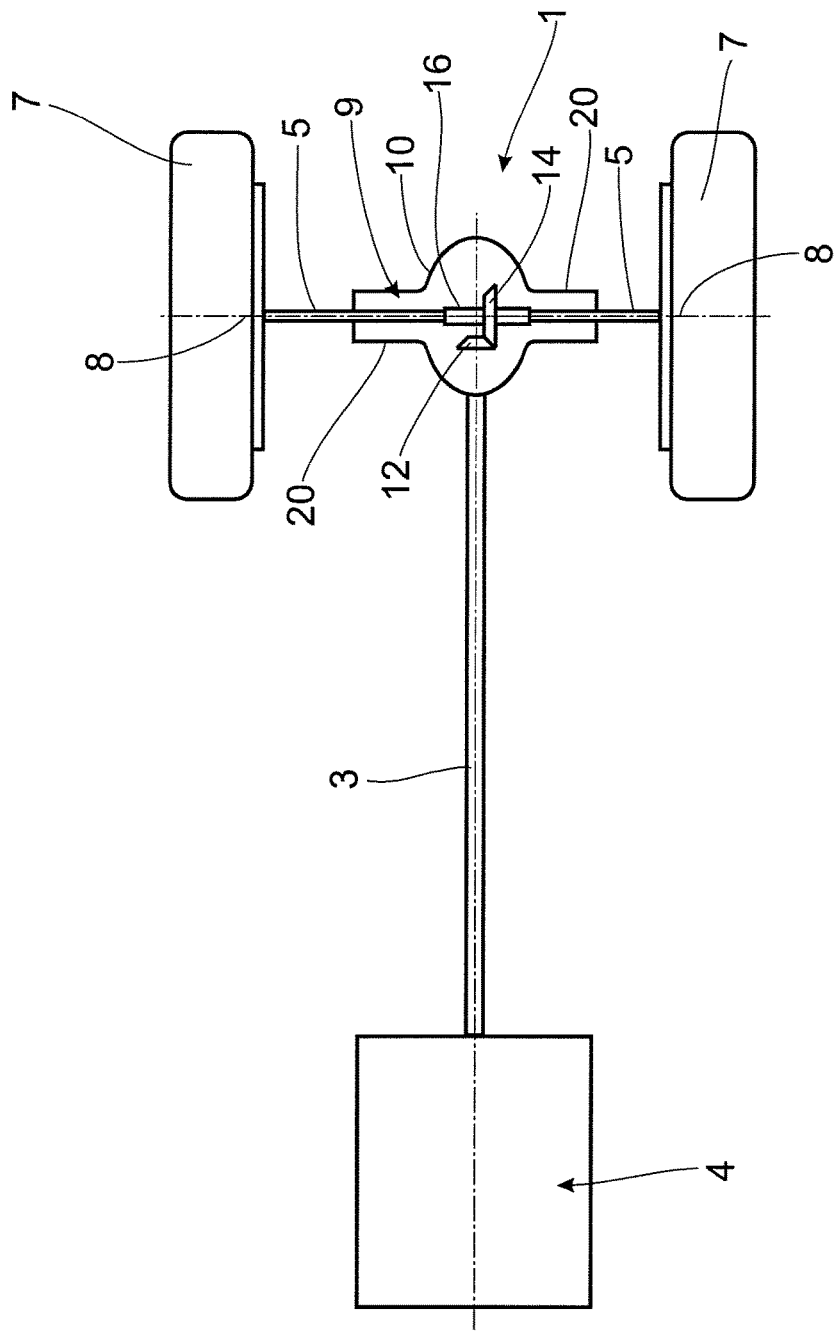
FIG. 1 is a schematic view of a prior art drive shaft and rear axle assembly.

The reference numerals from FIGS. 1 and 2 will be maintained in the following drawings except where the disclosed embodiments differ.

Figure 3:
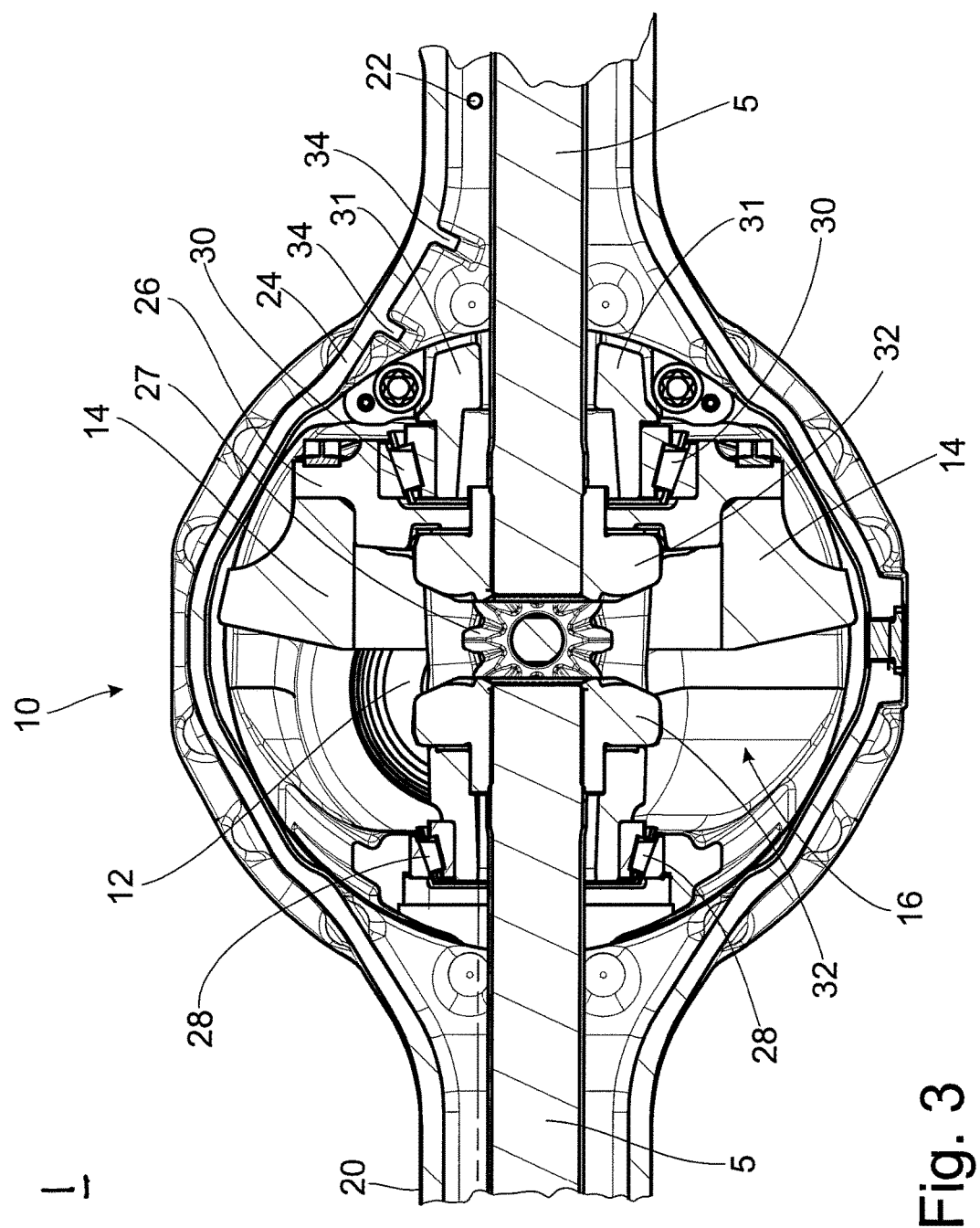
FIG. 3 is a sectional view of an axle assembly having a stationary housing according to an embodiment of the present invention.
Figure 4:
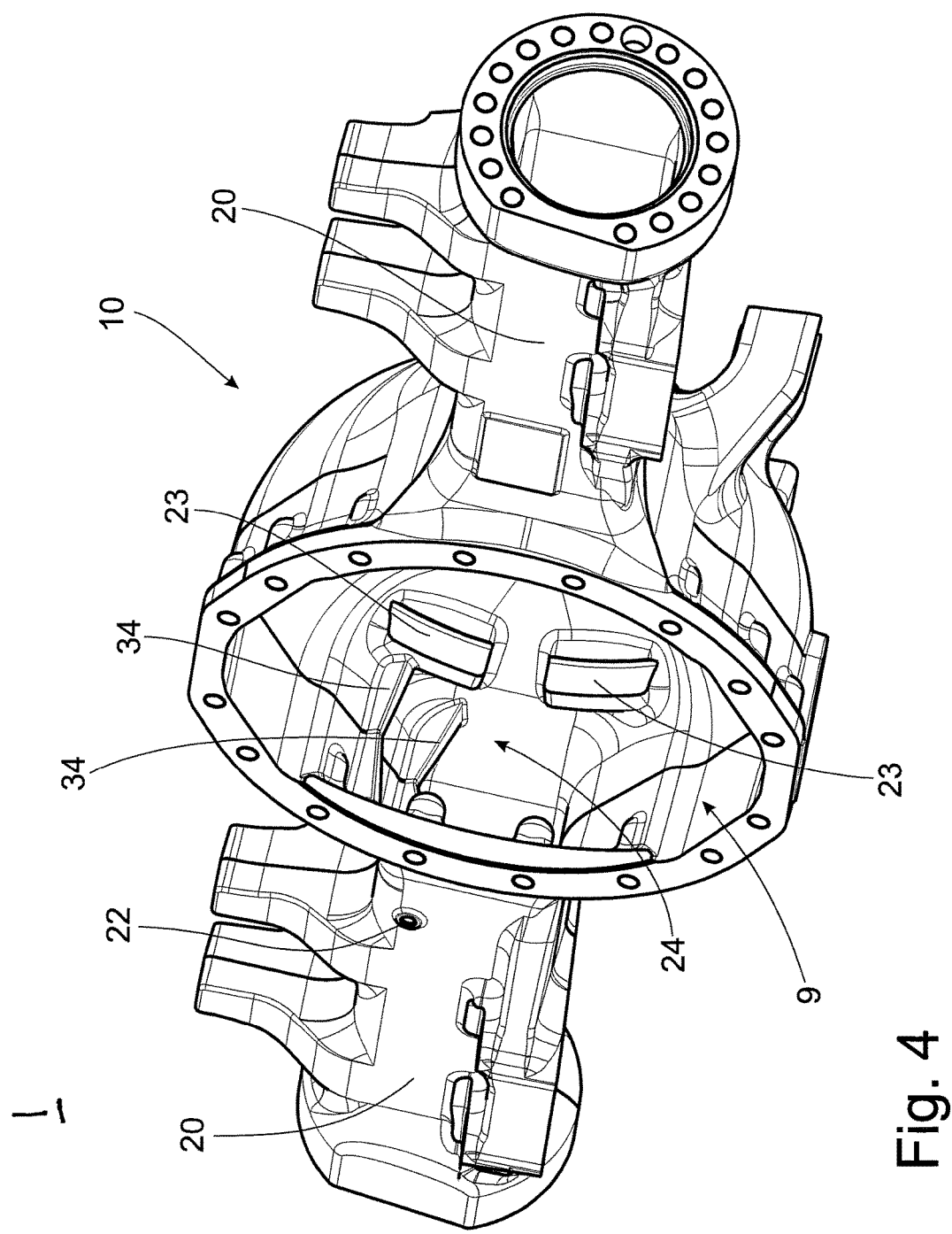
FIG. 4 is a sectional view of an axle assembly having a stationary housing according to an embodiment of the present invention without showing the drive shaft or the differential unit.
Figure 5:
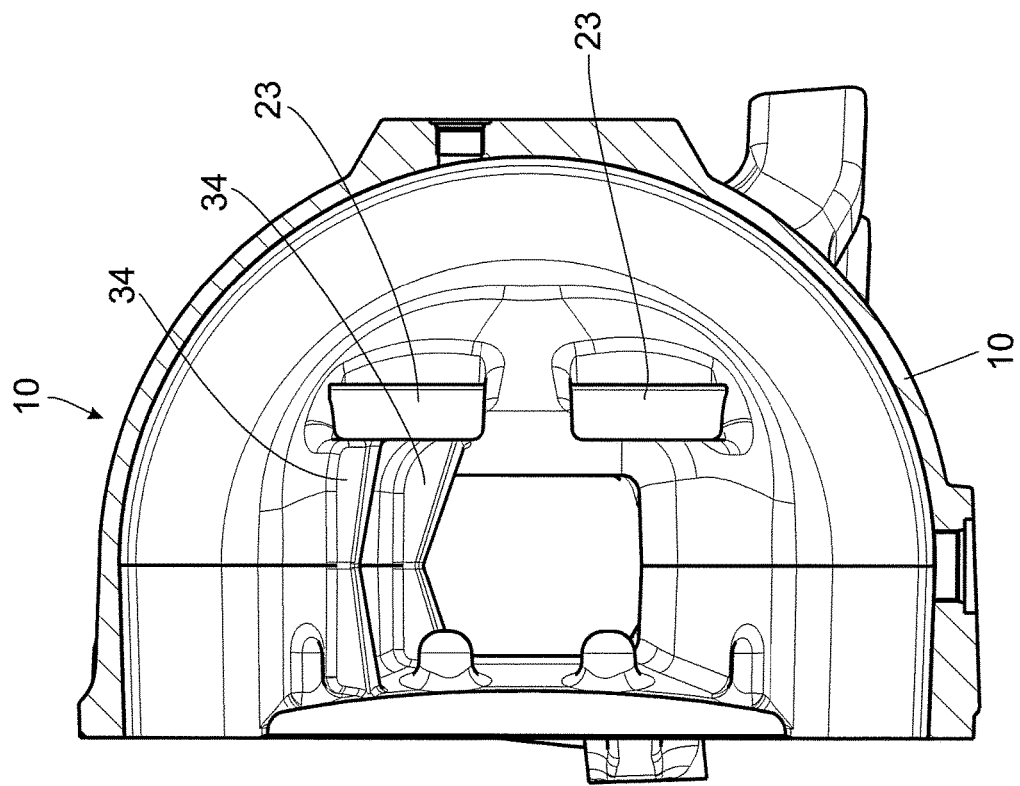
FIG. 5 is a side sectional view of the stationary housing shown in FIGS. 3 and 4.

FIGS. 3-5 are views of the axle assembly 1 according to an embodiment of the present invention having a stationary housing 10 and axle housing 20.

FIG. 3 is a sectional view showing the stationary housing 10 according to the present invention with a differential unit 16 installed within the stationary housing 10. As discussed above, a driveshaft 3 (not visible in this view), which is rotatably drivable by an engine of a vehicle, is guided into the interior 9 of the stationary housing 10 approximately horizontally.

At its end, the driveshaft 3 carries a driving gear wheel 12, visible in FIG. 3 behind the components of the differential unit 16. The driving gear wheel 12 is formed as, for example, a bevel gear configured to mesh with a crown wheel 14 of the differential unit 16. The crown wheel 14 is likewise formed as a bevel gear.

Figure 2:
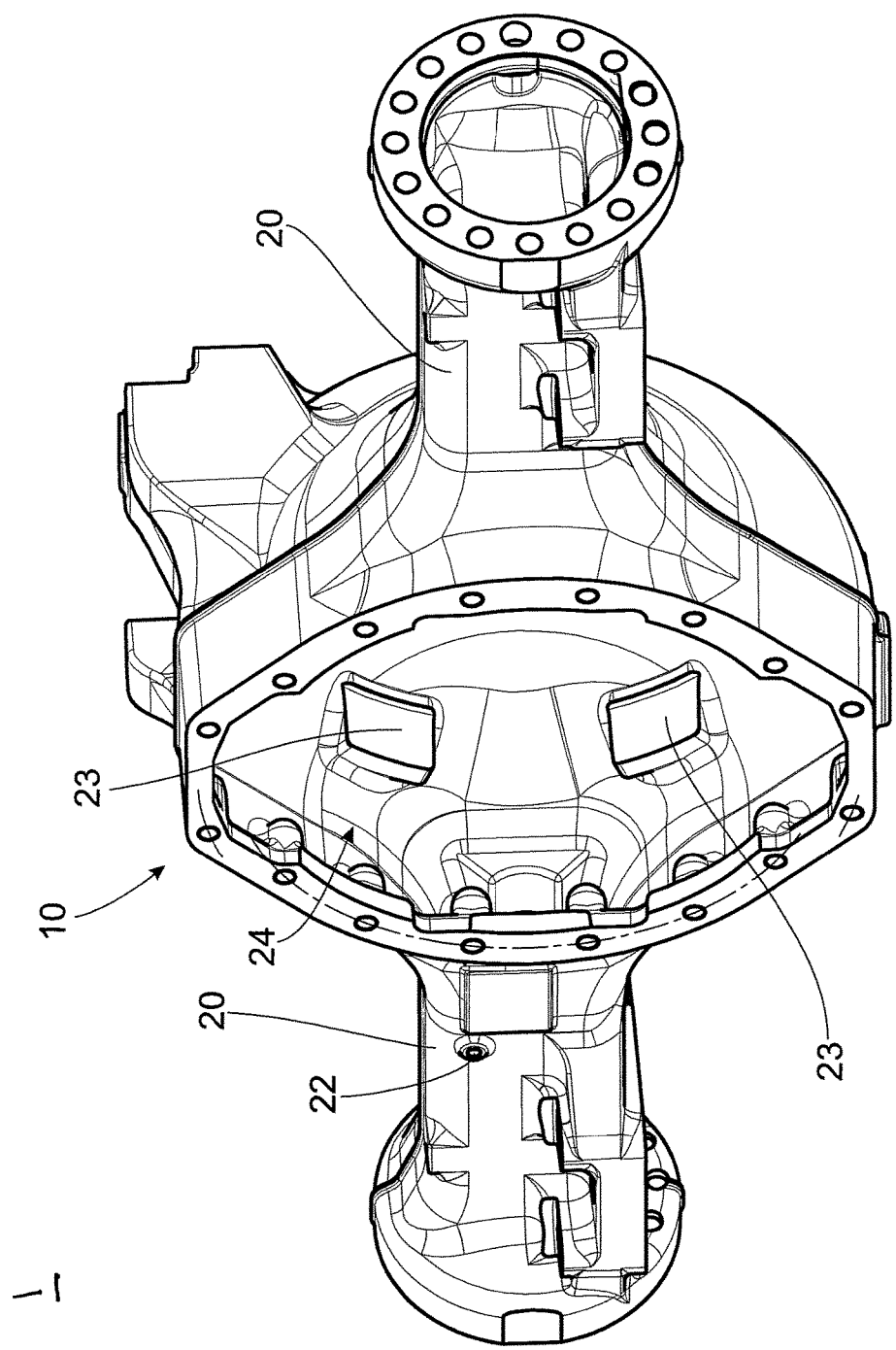
FIG. 2 is a sectional view of a prior art axle assembly having a stationary housing without showing the drive shaft or the differential unit.

A differential housing 26 is fixedly connected to the crown wheel 14 and is bearing-mounted at two differential bearings 28, 30 so as to be rotatable around an axis of rotation 8, illustrated in FIG. 1, extending at right angles to the axis of rotation of the driveshaft 3.

The first differential bearing 28 is connected to the stationary housing 10, typically by a screw connection (not shown). The second differential bearing 30 is supported by the bearing bracket 31.

Driven gear wheels 32 are formed as bevel gears and are fixedly arranged on driven shafts 5 which extend opposed to one another through the axle housings 20 to drive the road wheels 7 of a vehicle. The bevel gears of the driven gear wheels 32 are bearing-mounted at the differential housing 26 so as to be freely rotatable. A plurality of differential gear wheels 27 are rotatably drivable by the crown wheel 5, the driven gear wheels 32 being rotatably drivable by the differential gear wheels 27.

The interior 9 of the housing 10, including the above-mentioned axle bracket 24, are partially filled with a lubricating liquid, e.g., oil. Ribs 34, which will be discussed in greater detail below, can be seen at the upper right of FIG. 3 projecting from the interior of the stationary housing 10 in the area of the axle bracket 24. The venting bore 22 is visible at the upper right of FIG. 3 in one of the axle housings 20.

FIGS. 4 and 5 illustrate the axle assembly 1, including the stationary housing 10 and axle housings 20, in accordance with an embodiment of the present invention. For ease of viewing the interior of the stationary housing 10 and the ribs 34, the stationary housing 10 is shown in FIGS. 4 and 5 without the differential unit 16 installed.

As can be seen from FIGS. 4 and 5, the stationary housing 10 communicates with axle housings 20, through which the axles 5 pass towards the wheels 7. A venting bore 22, which allows pressurized air to escape upon excessive buildup of such air, is located in one of the axle housings 20. Differential supports 23 are formed in the interior of the stationary housing 10 and provide support for the differential unit 16. An oblique upper wall of the interior 9 of the stationary housing 10 forms an axle bracket 24 in the area of the stationary housing 20 close to where the axle housing 20 joins the stationary housing 10.

In accordance with a particularly advantageous aspect of the disclosed embodiment of the present invention, two ribs 34 are arranged, substantially parallel to one another, in the interior 9 of the stationary housing 10 at the axle bracket 24. As discussed above, in prior art stationary housings, the splashing of lubricating liquid by the moving components of the differential unit 16, and the driveshaft gear 12, causes lubricating liquid to travel along the interior walls at the axle bracket 24 in such a way that the lubricating liquid escapes from the venting bore 22. The ribs 34 of the present invention prevent this from happening. FIG. 5 shows the arrangement of the ribs 34 in a side view, looking down the axle housing 20.

While two ribs 34 are shown in the illustrated embodiment, the number of ribs is not limited to two. More than two ribs can be utilized, and even providing a single rib 34 provides the advantageous effect of the present invention.

As shown in FIGS. 4 and 5, each of the ribs 34 is arranged transversely, across the top of interior 9 of the stationary housing in the area of the axle bracket 24. In particular, each of the ribs 34 is arranged to extend in a direction substantially perpendicular to the axis of rotation 8 of the axles 5, and substantially parallel to the direction of the drive shaft 3.

Each rib has a radial width dimension, extending from the top of the axle bracket 24 and downwardly into the interior 9 of the stationary housing 10. This radial width dimension is provided so as to be sufficient to intercept lubricating liquid that is splashed from the moving components housing in the stationary housing, but without contacting any moving parts of the differential unit 16. This orientation of the ribs, with a projecting radial width, allows the walls of the ribs 34 that face the differential unit 16 to intercept the splashed lubricating liquid, preventing the lubricating liquid from migrating towards the venting bore 22. The dimensions of the longitudinal extent and axial extent of the ribs will vary depending on the size of the stationary housing 10 in which they are arranged and the components arranged within the stationary housing 10 and can easily be determined by a person of skill in the art.

By virtue of the operation of the ribs 34, rather than migrate toward the venting bore 22, splashed lubricating liquid is intercepted and collects on the inner wall faces of the ribs 34. Advantageously, any lubricating liquid that collects on the inner wall surfaces of the ribs 34 in this manner will simply, by the force of gravity, drip back down into the stationary housing 10, so that substantially the same amount of lubricating liquid remains available for lubricating the moving parts of the differential unit 16.

Preferably, the ribs 34 are formed integrally in the same casting process that forms the stationary housing 10, which is preferably made of cast iron, or other appropriate metal or alloy. However, the invention is not limited to the ribs 34 being formed integrally. The ribs 34 may instead, for example, be of a different material, such as a plastic, and be bolted, glued, or otherwise affixed, to the wall of the stationary housing in the location shown in the figures.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. An axle assembly (1) for a drive device for road wheels (7) of a vehicle, comprising:
    a stationary housing (10) having a housing interior (9) at least partially filled with a lubricating liquid;
    differential supports (23) arranged in the housing interior (9), the differential supports contactingly supporting a differential of the drive device;
    axle housings (20) connected to and extending from the stationary housing (10) and structured and arranged with respect to the stationary housing (10) so as to provide respective openings through which the axles (5) of the vehicle pass towards the road wheels (7);
    a venting bore (22) in one of the axle housings (20) configured to allow pressurized air to escape from the stationary housing (10); and
    at least two ribs (34) arranged, parallel or substantially parallel to each other, at an upper surface of said housing interior (9) of said stationary housing (10) and positioned transverse to a direction of the one of the axle housings (20) having the venting bore (22), said at least two ribs (34) being arranged in a region of the housing interior (9) at which the stationary housing (10) joins the one of the axle housings (20) having the venting bore (22) so as to prevent migration of the lubricating liquid out of the venting bore (22), at least one of the at least two ribs (34) being arranged in the housing interior (9) so as to extend from one of the differential supports (23) to an opposing wall of the stationary housing (10).

2. The axle assembly (1) according to claim 1, wherein each of said at least two ribs (34) comprises a wall portion projecting radially inwardly in relation to the housing interior (9) and configured to intercept lubricating liquid in said stationary housing (10).

3. The axle assembly (1) according to claim 1, wherein said at least two ribs (34) are formed integrally with said stationary housing (10).

4. The axle assembly (1) according to claim 1, wherein said at least two ribs (34) are fastened to said housing interior (9) of said stationary housing (10).

5. The axle assembly (1) according to claim 1, wherein said at least two ribs (34) are arranged substantially parallel with a drive shaft of the drive device and perpendicular to an axis of rotation of the axles (5).

6. The axle assembly (1) according to claim 1, wherein the number of the at least two ribs (34) equals two.

* * * * *